(12) United States Patent
Howard et al.

(10) Patent No.: US 12,030,390 B2
(45) Date of Patent: *Jul. 9, 2024

(54) COMPOSITE BATTERY ENCLOSURE

(71) Applicant: TPI Composites, Inc., Warren, RI (US)

(72) Inventors: Michael F. Howard, Attleboro, MA (US); McKevin Veloso, Providence, RI (US)

(73) Assignee: TPI Composites, Inc., Warren, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/360,479

(22) Filed: Jun. 28, 2021

(65) Prior Publication Data

US 2021/0323418 A1 Oct. 21, 2021

Related U.S. Application Data

(63) Continuation of application No. 16/689,599, filed on Nov. 20, 2019, now Pat. No. 11,084,386.

(Continued)

(51) Int. Cl.
*B60K 1/04* (2019.01)
*B60L 50/64* (2019.01)
(Continued)

(52) U.S. Cl.
CPC .............. *B60L 50/64* (2019.02); *B60K 1/04* (2013.01); *H01M 50/209* (2021.01);
(Continued)

(58) Field of Classification Search
CPC .......... B60L 50/64; B60L 50/66; B60K 1/04; B60K 2001/005; H01M 2220/20; H01M 50/209; H01M 50/249
See application file for complete search history.

(56) References Cited

U.S. PATENT DOCUMENTS 10,886,513 B2 * 1/2021 Stephens ................. B60K 1/04
11,084,386 B2 * 8/2021 Howard ................. B60L 50/64
(Continued)

FOREIGN PATENT DOCUMENTS

CN 102742044 A 10/2012
CN 103855341 A 6/2014
(Continued)

OTHER PUBLICATIONS

International Search Report and Written Opinion for International Application No. PCT/US2019/062411 dated Jan. 16, 2020.
(Continued)

*Primary Examiner* — Jason D Shanske
*Assistant Examiner* — James J Triggs
(74) *Attorney, Agent, or Firm* — Stephen J. Kenny; Foley Hoag LLP

(57) ABSTRACT

A battery enclosure for a vehicle chassis comprising a base plate having an upper and lower surface and a plurality of edges; an external support structure with a flange portion on a lower surface thereof and disposed on an upper surface of the base plate to circumscribe the base plate edges; a battery tray with a flange portion extending from an upper surface thereof is disposed on an upper surface of the base plate. The battery tray includes a plurality of raised surface features on the upper surface outlining individual cells, each cell configured to receive at least one battery. A lid is disposed on the flange of the battery tray with the external support structure disposed below the battery tray flange, and extending around the battery tray edges.

20 Claims, 8 Drawing Sheets

Related U.S. Application Data

(60) Provisional application No. 62/769,925, filed on Nov. 20, 2018.

(51) Int. Cl.
*H01M 50/209* (2021.01)
*H01M 50/249* (2021.01)
*H01M 50/28* (2021.01)

(52) U.S. Cl.
CPC ......... *H01M 50/249* (2021.01); *H01M 50/28* (2021.01); *H01M 2220/20* (2013.01)

(56) References Cited

U.S. PATENT DOCUMENTS

| | | | |
|---|---|---|---|
| 2009/0242299 A1* | 10/2009 | Takasaki | B60L 50/66 180/68.5 |
| 2012/0156539 A1 | 6/2012 | Honjo et al. | |
| 2012/0223113 A1 | 9/2012 | Gaisne et al. | |
| 2012/0251863 A1 | 10/2012 | Berger et al. | |
| 2012/0301765 A1* | 11/2012 | Loo | H01M 50/224 429/100 |
| 2013/0192914 A1 | 8/2013 | Nakamori | |
| 2014/0045026 A1 | 2/2014 | Fritz et al. | |
| 2015/0255764 A1 | 9/2015 | Loo et al. | |
| 2018/0337377 A1 | 11/2018 | Stephens et al. | |
| 2019/0131602 A1* | 5/2019 | Hilfrich | H01M 50/278 |
| 2020/0156486 A1 | 5/2020 | Howard et al. | |
| 2021/0323418 A1 | 10/2021 | Howard et al. | |

FOREIGN PATENT DOCUMENTS

| | | |
|---|---|---|
| EP | 2332761 A1 | 6/2011 |
| EP | 2528135 A1 | 11/2012 |
| EP | 3345779 A1 | 7/2018 |
| JP | H10250622 A | 9/1998 |
| JP | 2003133756 A | 5/2003 |
| JP | 2013032066 A | 2/2013 |
| JP | 2014065490 A | 4/2014 |
| WO | WO-2018/082896 A1 | 5/2018 |
| WO | WO-2020/106837 A1 | 5/2020 |

OTHER PUBLICATIONS

Extended European Search Report for EP Application No. 19886584.2 dated Nov. 18, 2022.

* cited by examiner

COMPOSITE BATTERY ENCLOSURE

CROSS REFERENCE TO RELATED APPLICATIONS

This application is a Continuation of and claims the benefit of priority under 35 USC 120 to U.S. application Ser. No. 16/689,599 filed Nov. 20, 2019, which claims the benefit under 35 USC 119 of U.S. Provisional Application No. 62/769,925, filed Nov. 20, 2018, each is hereby incorporated by reference in its entirety.

BACKGROUND OF THE DISCLOSED SUBJECT MATTER

Field of the Disclosed Subject Matter

The disclosed subject matter relates to a system for a composite closure compartment. Particularly, the present disclosed subject matter is directed to a composite battery enclosure.

Description of the Art

A variety of structures for battery enclosures are known that are self-supporting and are structurally separate from the balance of the vehicle system. This results in added mass for the entire system and thus reduced economy (increasing manufacturing costs) and lower performance (higher weight decreases range of operation between charges or lower fuel economy in a hybrid).

The large mass of batteries typically requires significant material to provide the stiffness and strength to retain the battery or batteries within the vehicle system. Similarly, the battery enclosure of conventional designs requires significant reinforcement to prevent intrusion of objects in the event of a vehicle crash. The structural requirements for the vehicle and the battery enclosure have been traditionally separated whereby the battery enclosure becomes purely parasitic mass and redundant to the performance of the vehicle.

Examples of conventional battery enclosures are provided in the following publications, each of which is hereby incorporated by reference in their entirety: U.S. Pat. Nos. 8,286,743, 8,393,427, 8,833,499, 5,620,057, 7,323,272, 8,115,450, 8,210,301, 8,875,828, 9,331,321; and U.S. Patent Application Publication Numbers 20100136402, 20120103714, 2015079454 and 2015318525.

The presently disclosed subject matter provides a new innovative solution for the storage, protection and use of batteries for hybrid, plug-in hybrid and electric vehicle applications. Among the benefits of the present disclosure are:

Weight savings (e.g. up to 30%) over traditional metallic design
Increase in the range of vehicle due to weight (and thus power) savings
Prohibits/inhibits ingress/egress of fluids from battery containment area
Prohibits/inhibits flame ingress and damage to batteries from external burning
Prohibits/inhibits exposure to fire and chemical release in the event of internal leakage of battery modules
Prohibits/inhibits damage to batteries in the event of front, rear or side impact
Prohibits/inhibits damage to batteries from jacking loads incurred on the base plate of the enclosure
Prohibits/inhibits damage to batteries from vertical crush loads
Enclosure remains environmentally sealed during elevated internal pressure
Enclosure shields against electro-magnetic frequencies, limiting emitted frequency intensities to the allowable limits as outlined by CISPR
Surfaces electrically and thermally nonconductive
Integrates molded cooling channels into battery tray, eliminating need for installing a separate system.

Moreover, the system and structures of the presently disclosed battery enclosure are applicable in hybrid, plug-in hybrid and plug-in electric passenger vehicles for transportation as well as other mass transportation systems (e.g., buses, shuttles and rail cars).

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a battery enclosure for a vehicle chassis comprising: a base plate having an upper and lower surface and a plurality of edges; an external support structure having an upper surface and a lower surface with a flange portion extending from a lower surface thereof, the external support structure disposed on an upper surface of the base plate and extending around a plurality of the base plate edges; a battery tray having an upper and lower surface with a flange portion extending from a upper surface thereof and a plurality of edges, the battery tray disposed on an upper surface of the base plate and having a plurality of raised surface features on the upper surface outlining individual cells, each cell configured to receive at least one battery; a lid having an upper and lower surface, the lid disposed on the flange of the battery tray; and wherein the external support structure is disposed below the battery tray flange and extends around a plurality of the battery tray edges.

In some embodiments, the raised surface features of the battery tray include solid beams. In some embodiments, at least one of the base plate, external support structure, battery tray and/or lid is composed of composite materials. In some embodiments, the upper surface of the lid is coupled to a vehicle chassis. In some embodiments, the external support structure includes at least one rocker support structure. In some embodiments, the external support structure includes at least one corner joining node between adjacent linear beams.

In some embodiments, the individual cells include a plurality of symmetric cells.

In some embodiments, a seal is formed between the lid and the battery tray. In some embodiments, a seal is formed between the battery tray and the external support structure. In some embodiments, a seal is formed between the external support structure and the base plate.

In some embodiments, the external support structure flange extends outward a first distance, and the battery tray flange extends outward a second distance. In some embodiments, the first distance is greater than the second distance. In some embodiments, the lid engages with the raised surface features of the battery tray to form at least one closed volume cell. In some embodiments, the externa support structure forms a load-bearing structure. In some embodiments, the upper surface of the load-bearing structure engages the lower surface of the battery tray flange.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for a battery enclosure structure. The disclosed subject matter is particularly suited for a composite battery enclosure structure that includes a plurality of components, each of which can be optimized to perform to their necessary characteristics such as electromagnetic compression, fire resistance, high strength and high stiffness due to designing with multi-material composite laminates. Additionally, the battery enclosure of the present disclosure reduces the electrically conductive surface area, thereby improving ease of installation of electrical componentry associated with the vehicle. Similarly, the battery enclosure of the present disclosure reduces the amount of thermally conductive material, thereby improving thermal insulation and reducing work required by battery cooling systems.

Figure 1:
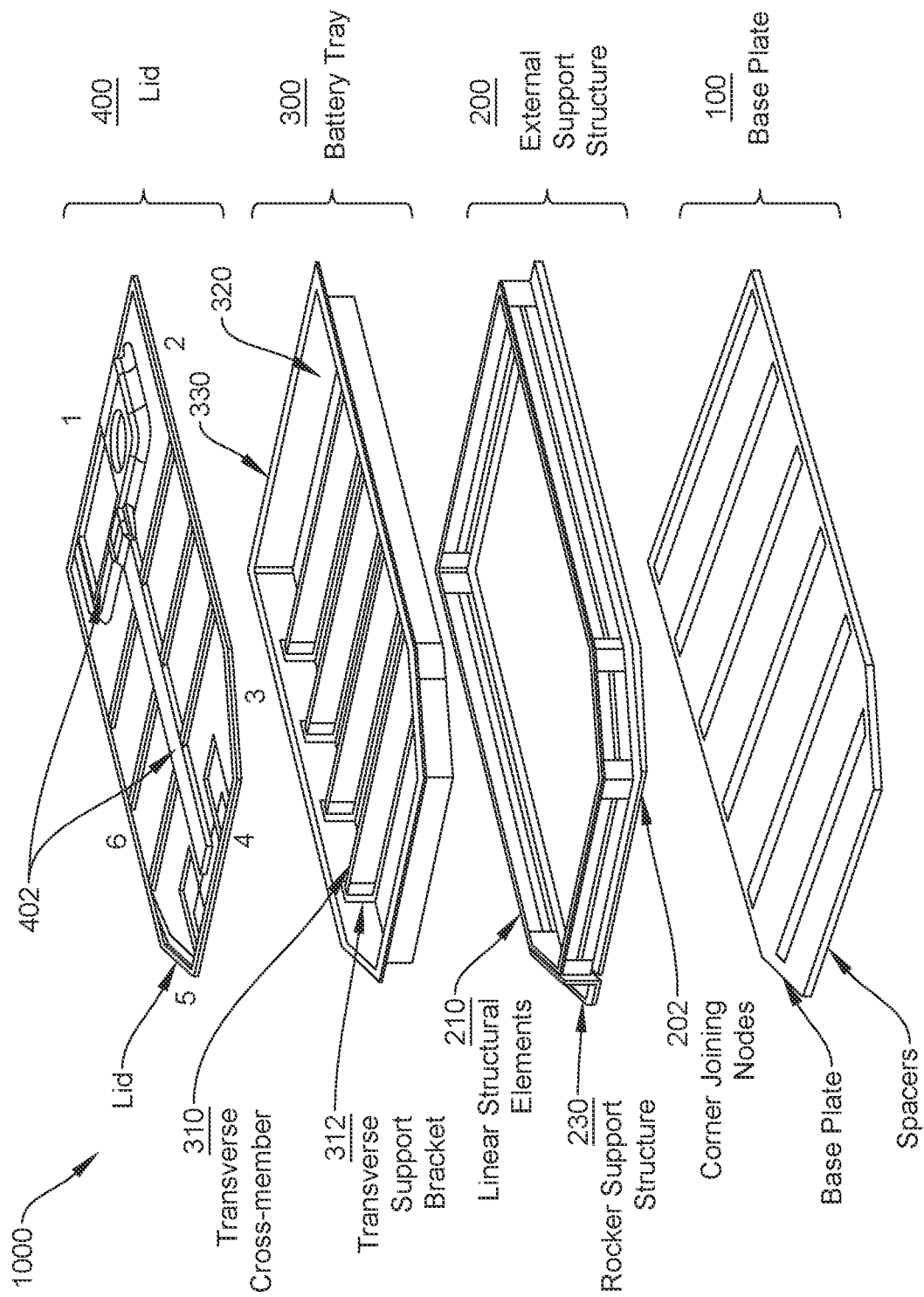
FIG. 1 is an exploded schematic representation showing a perspective view of the components of the battery enclosure in accordance with the disclosed subject matter.

For purpose of explanation and illustration, and not limitation, an exemplary embodiment of the system in accordance with the disclosed subject matter is shown in FIG. 1 and is designated generally by reference character 1000. Similar reference numerals (differentiated by the leading numeral) may be provided among the various views and Figures presented herein to denote functionally corresponding, but not necessarily identical structures. As shown in FIG. 1, the battery enclosure system 1000 generally includes a plurality of components including a base member plate 100, a cover member 200 and lattice support structure 300, each of which is described in further detail below.

Lid Member

Figure 7:
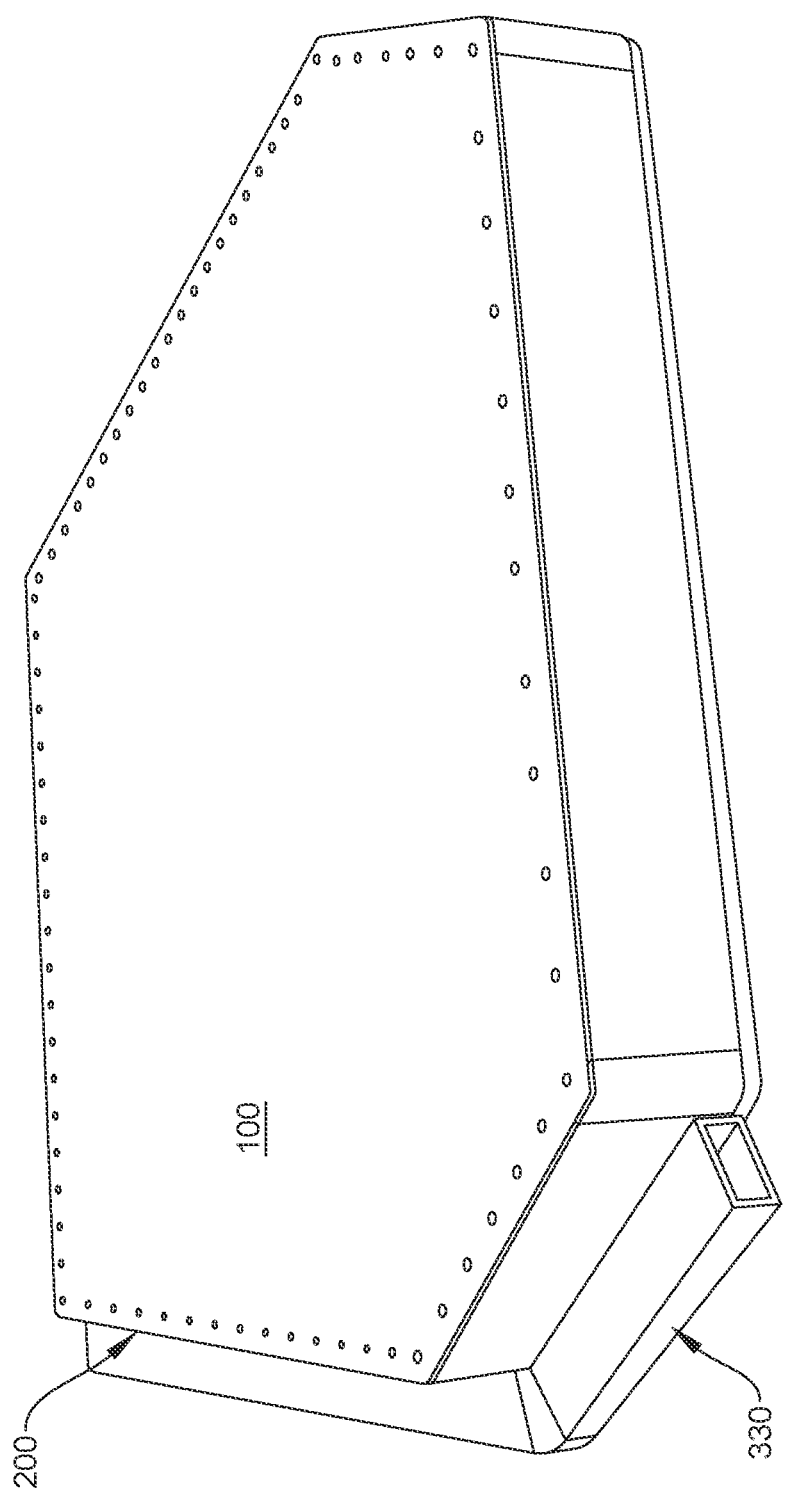
FIG. 7 is an exemplary embodiment of an assembled battery enclosure with lid in accordance with the disclosed subject matter.
Figure 8:
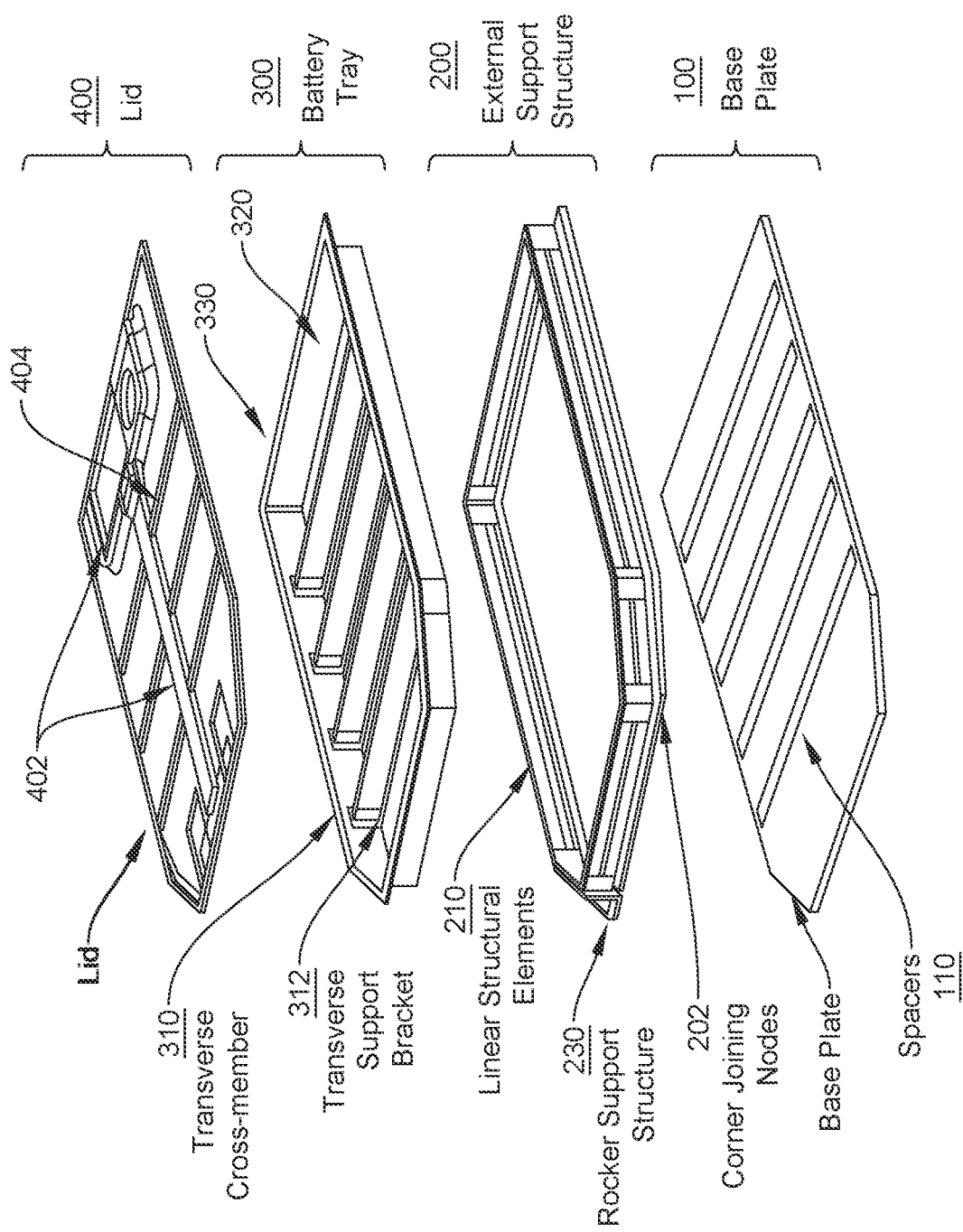
FIG. 8 is another exploded schematic representation showing a perspective view of the components of the battery enclosure in accordance with the disclosed subject matter.

FIGS. 1, 7 and 8 show an exemplary embodiment of the upper structure of the battery enclosure. The lid 400 can be configured with a variety of sizes/shapes such that the perimeter of the lid coincides for sealing with the battery tray 300 (discussed in further detail below). These seal(s) can enclose and effectively separate individual battery modules from the vehicle chassis, prevent moisture intrusion/immersion and eliminate dust/debris accumulation. The seal(s) can be a continuous member that circumscribes the battery tray and lid perimeter, or a plurality of discrete members. Also, the seal can be sized and shaped to extend above the battery tray and be formed from an elastic material that allows for compression of the seal upon closure of the lid 400.

In some embodiments the lid 400 can include an access panel or window, which can be removable and/or hingedly or slidingly attached to the lid. Such a window permits access to the underlying battery cells to permit repair/replacement of individual cells. In the exemplary embodiment shown in FIG. 1, the lid includes a shroud 402 which can be raised with respect to the remainder of the lid to provide a tunnel for routing wiring and battery management system. The shroud 402 can include a first portion surrounding the access window, and a longitudinal portion extending from the window to the edge of the lid 400. The lid 400 can be constructed to withstand elevated internal pressures and burn temperatures, e.g., up to an exceeding 1 Bar; fire resistant up to or exceeding 1200° C. with no burn through after 2 minutes of exposure.

Additionally, the lid 400 can shield emission of Electro-Magnetic Frequencies (EMF) over a range of frequencies, e.g. 1 kHz to 1 GHz, while providing electrical continuity through attached surfaces designed for EMF containment and electrical grounding. The EMF shielding can be incorporated in a variety of ways, e.g., EMF shielding can be provided throughout the lid 400 in the form of a metal-filled paint, conductive ink, or as a metal foil or wire mesh embedded or woven into the laminate. In such embodiments, the current moves between the tray, the lid and the chassis of the vehicle via bolts and screws. Additionally, or alternatively, metal rods, chains or nails can be employed as an electrical transmission method. For example, the rails 404 as shown in FIGS. 1 and 8 can be designated to conduct electrical currents across the lid. In some embodiments the lid 400 can incorporate reinforcements including carbon, fiberglass, aramid, spectra, basalt, metallic wire and/or combinations thereof which enhance the structural integrity of the lid. In some embodiments the lid 400 can incorporate matrix materials including: Phenolic, Epoxy, Polyester, Vinylester and/or combinations thereof.

In some embodiments the lid 400 can incorporate additives including: ATH, intumescent solids, glass or plastic microspheres, internal release agents and/or combinations thereof. In some embodiments the lid 400 can incorporate pigments including: Carbon black, iron-oxide, nigrosine and/or combinations thereof. In some embodiments the lid 400 can incorporate coatings including intumescent paint, gelcoat and/or combinations thereof. Additionally, the lid 400 can be configured with an integrally molded channel for a seal extending around the perimeter, and/or a bonded-on seal to form a leak tight union with the underlying battery tray 300. Examples of suitable seals include silicone, rubber, foam and fireproofing materials such as intumescent solids and EMI shielding materials such as nickel-graphite filler, silver and copper.

The lid can be formed with a complimentary geometry with the underlying battery tray 300, external support structure 200 and base plate 100. In the exemplary embodiment shown these components are formed with a hexagon shape, with sides numbered 1-6, in which a rear end of the assembly is wider than the front end of the assembly. As shown, the rear edge 1 and sides 2 and 6 of the assembly are oriented at approximately right angles; sides 3 and 5 are oriented at an angle (e.g. approx. 15°~45") to the edges 2 and 6; and front edge 4 is oriented parallel to rear edge 1. This exemplary configuration is advantageous in that it maximizes the capacity for battery storage, while minimizing the "footprint" by providing a tapered assembly that allows for more flexibility in placement proximate a vehicle wheel well.

The lid 400 can be designed to engage only the battery tray 300 when assembled, with the external support structure 200 and base plate 100 engaging/abutting the battery tray 300 directly. In other words, the lid 400 can remain spaced from the external support structure 200 and base plate 100. In some embodiments, adhesives can be applied along engaging surfaces of the respective components: lid 400, battery tray 300, external support structure 200 and base place 100.

Battery Tray

FIGS. 1 and 3-4, 6 show an exemplary embodiment of the lower structure of the battery tray.

In some embodiments, the battery tray 300 can be formed as a unitary molding with a plurality of axial and transverse surface features 310 that outline and form "cells" for receipt of the individual batteries that constitute the vehicle power system. The presence of such surface features 310 facilitates assembly by providing tactile and visual confirmation of proper installment of the batteries within each cell via proper registration of mating surfaces. Additionally, the formation of discrete cells is advantageous in that it can isolate adverse events (e.g. leakage, thermal change, etc.) between neighboring batteries within the enclosure.

In the exemplary embodiment shown, the surface features are raised or upwardly extending ribs or channels 310 which outline rectangular cells, though it is to be understood that the battery tray 300 can be formed with alternative shaped cells. Similarly, the surface features 310 can be formed as transverse cross members which protrude upwardly from the bottom surface of the battery tray 300. In the exemplary embodiment shown, the transverse cross members 310 have a height lower than the perimeter sidewall 320 of the battery tray 300. However, it is to be understood that various dimensions, and relative proportions, can be provided, as desired. The transverse cross members 310 can be formed as solid cross-section structures, or alternatively as hollow members to permit passage of wires and/or cooling conduits around the battery cells. The transverse cross members 310 can be integrally formed with the perimeter sidewalls 320, or transverse support brackets 312 can be included and fixedly attached to the sidewall 320 and configured to receive the transverse cross members 310 therein. This allows for select transverse cross members 310 to be removed/replaced to provide adjustable cell sizes to accommodate varying battery designs.

The battery tray 300 can also include a flange 330 surrounding a periphery, or select portion(s) thereof. The flange 330 can be coupled to the lid 400 on an upper surface thereof, and coupled to the external support structure 200 on the bottom surface thereof. In some embodiments the flange 330 can be formed with a width that extends a distance laterally which is less than the distance, or vertical height, of the surface features 310.

Additionally, the axial and transverse surface features 310, and flange portion 330, can be positioned to match or align with similar axial and transversely aligned surface features and flange portion in the lid 400 so as to fully engage/envelope and create a closed volume to contain the individual battery cells that are assembled within, as described in more detail below.

The battery tray 300 can be formed from a variety of materials including reinforcing fibers. Some illustrative examples of such reinforcing fibers include matrix materials including: Phenolic, Epoxy, Polyester, Vinylester; additives including: ATH, intumescent solids, glass or microspheres, internal release agents; pigments including: Carbon black, iron-oxide, nigrosine; coatings including: intumescent paint, gelcoat and/or combinations thereof. Additionally, similar to the description with respect to the lid 400 above, the battery tray 300 can include EMF shielding in form of conductive materials, (e.g. thin laminated foils, conductive inks, conductive paints, expanded metal foils, metallic woven systems).

In some embodiments, the battery tray 300 can include: integrated active cooling molded, bonded or fastened features; a heat transfer plate; attachment points for battery module connection; integrated bus bar for power conduction from batteries (serial/parallel); molded housing for battery management system; and/or reinforcements including carbon, fiberglass, aramid, spectra, basalt, and metallic wire. Various cooling mediums can be employed including air, water and/or a liquid coolant. The composite enclosure disclosed herein can include channels for coolant to flow through, thereby removing the need for a secondary cooling system assembly.

Additionally or alternatively, the battery tray 300 can include, e.g. in the wells formed by the transverse cross members 310, rivet nut fasteners for fastening of battery modules and/or bonded threaded inserts for fastening of battery modules. Also, the battery tray can include, e.g. distributed around the flange 330, rivet nut fasteners for fastening of lid 400 to tray 300 and/or bonded threaded inserts for fastening of lid to tray. The tray 300 can further include integrally molded channel(s) for a seal; bonded-on seal(s) which may include silicone, rubber, foam and fireproofing materials such as intumescent solids and EMI shielding materials such as nickel-graphite filler, silver and copper. Further, the tray 300 can include bonded-on or fastened-on thermally conductive plates for cooling battery modules. In some embodiments, these plates can be bonded/mounted to the battery tray or the base plate and the battery modules can sit directly on top of the plates.

The battery tray 300 can also include mounting holes or bracketry for the attachment of burst discs (which can be located on a side of the enclosure, e.g. rear side of vehicle); mounting holes or bracketry for pressure relief valve(s); covers for slots or holes to shield against EMF emission which may include any combination of aluminum plate, aluminum wire, copper wire, brass wire, nickel-graphite filled silicone and may require bonding or fastening to the tray.

External Support Structure

Figure 2:
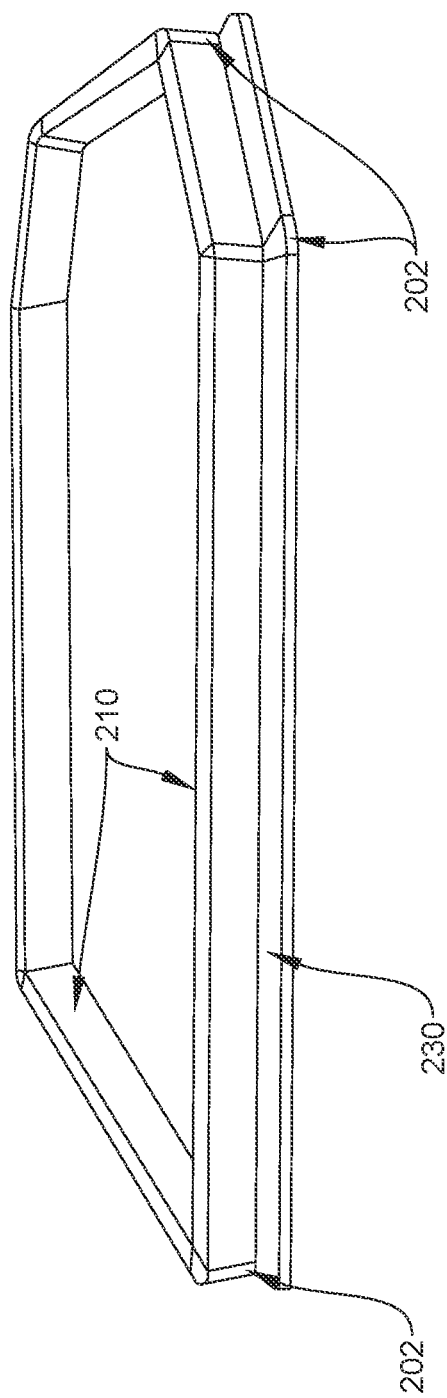
FIG. 2 is an exemplary embodiment of an external support structure in accordance with the disclosed subject matter.
Figure 3:
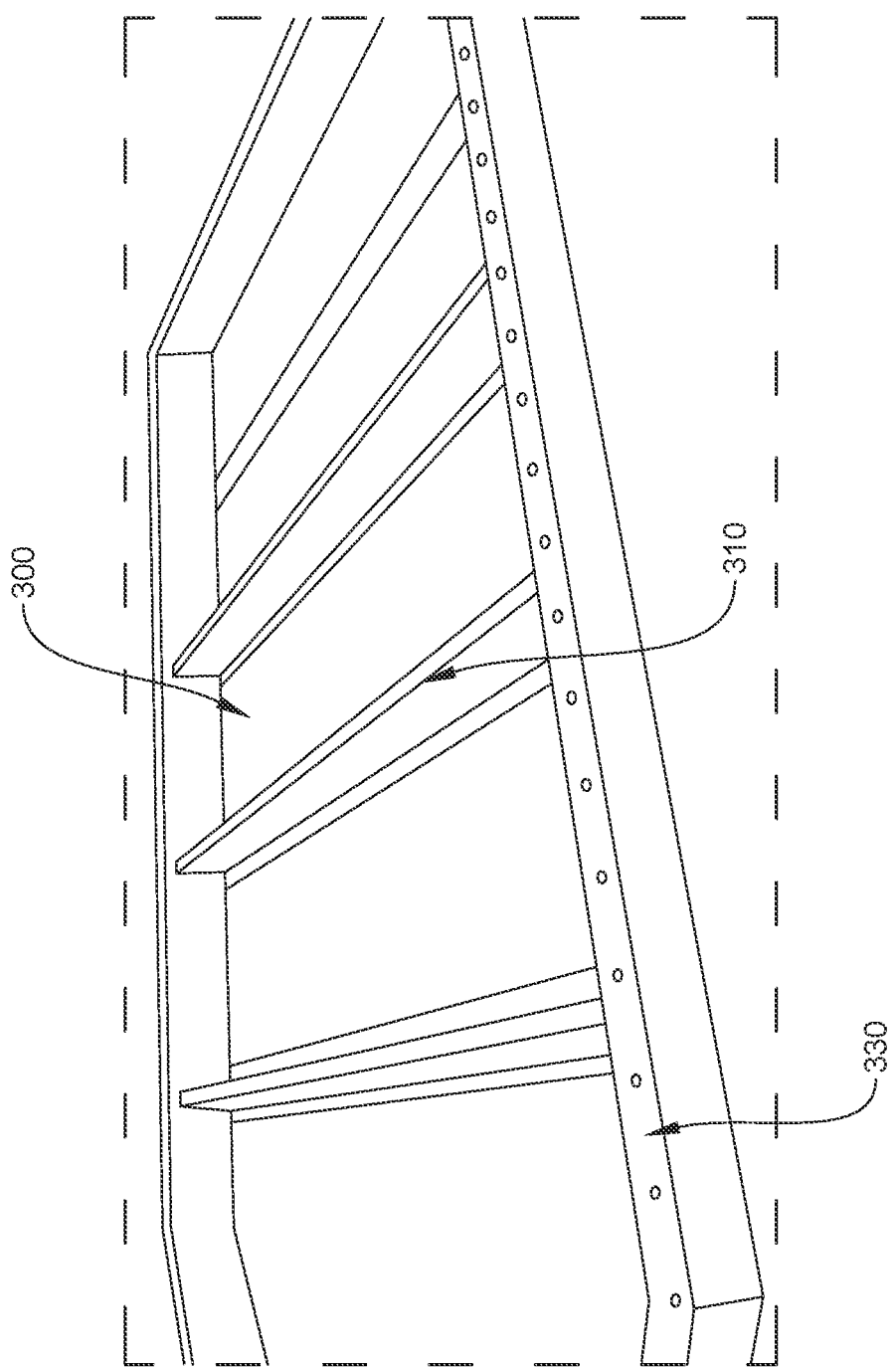
FIG. 3 is an exemplary embodiment of a battery tray with perimeter holes and transverse cross-members in accordance with the disclosed subject matter.
Figure 4:
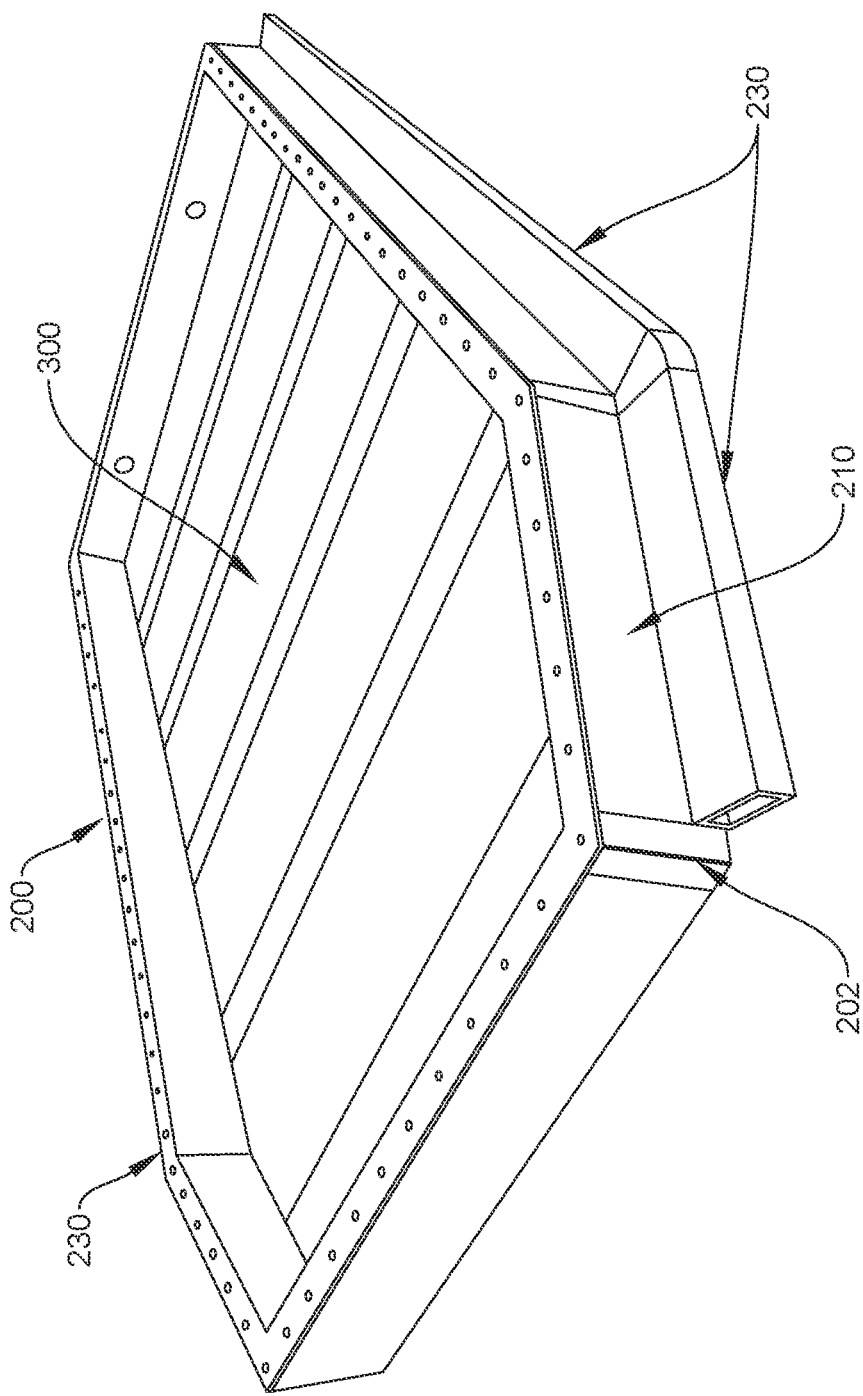
FIG. 4 is an exemplary embodiment of a battery tray bonded to an external support structure in accordance with the disclosed subject matter.
Figure 5:
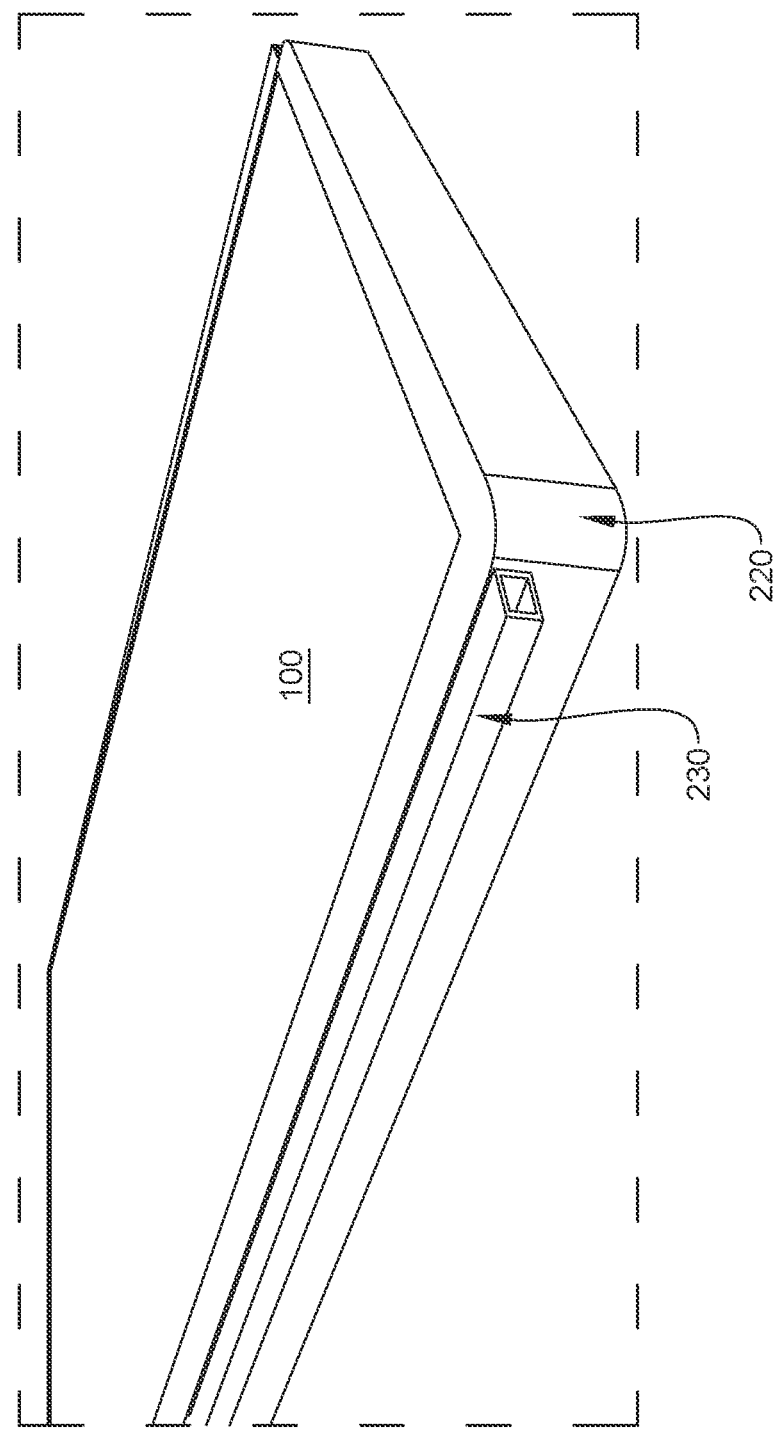
FIG. 5 is an exemplary embodiment of a base plate bonded onto the underside of a battery enclosure in accordance with the disclosed subject matter.
Figure 6:
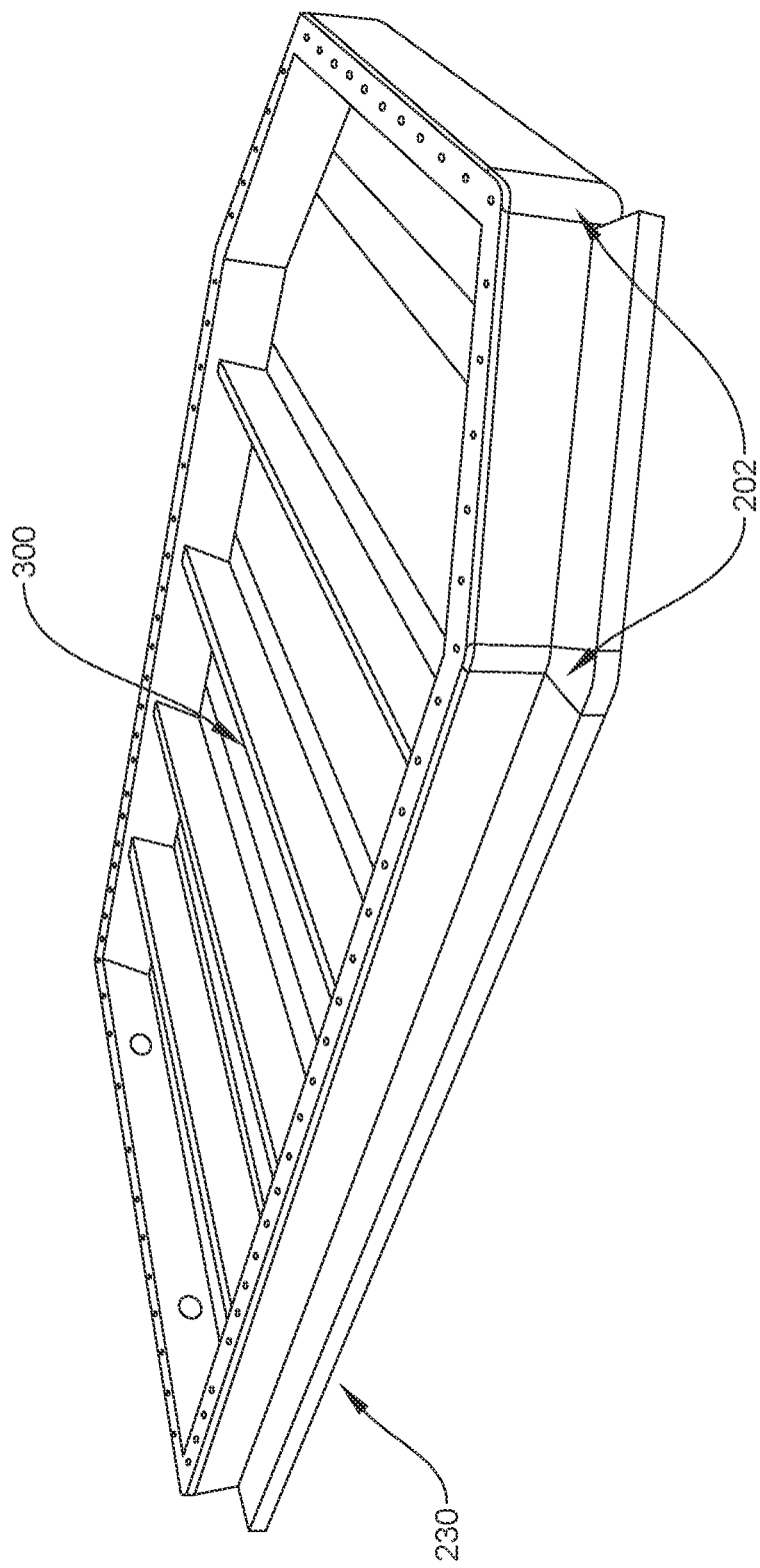
FIG. 6 is an exemplary embodiment of a battery enclosure assembly with lid removed to display bonded aluminum cooling plates, bonded transverse cross members with bonded triangular support brackets and cross member-mounted lid attachment brackets in accordance with the disclosed subject matter.

FIGS. 1 and 2 show an exemplary embodiment of the external support structure 200 of the battery enclosure.

In some embodiments, the external support structure 200 can be formed as a unitary/integral structure which is molded, pultruded, infused, prepreg, filament winding, and/or braided. The structure can include reinforcements such as carbon, fiberglass, aramid, basalt; matrix materials including phenolic, epoxy, vinyl-ester, polyester.

In some embodiments, the external support structure 200 can be formed as a multi-component structure having joining nodes 202 which can be machined, cast, metal injection molded, 3D printed, and/or extruded forms of aluminum, zinc, steel, brass, titanium or alloy of any aforementioned metal. Additionally, or alternatively, joining nodes 202 can include injection-molded, cast, molded or 3D printed plastic Which may include structural fillers such as fiberglass, carbon fiber, aluminum fiber or steel fiber. The joining nodes 202 can be placed between adjacent linear structural elements 210 (e.g. beams or spars) of the external support structure. In some locations the joining nodes 202 have a linear/planar surface, in other locations the joining nodes have a curved/arcuate surface. The joining nodes 202 can receive adjacent linear structural elements 210 (e.g. beams or spars) of the external support structure in a male/female union or tongue and groove coupling.

A rocker support structure 230, e.g. flange, can be provided which improves the side and/or rear impact buffer by absorbing/dissipating energy upon impact. Additionally, the rocker support 230 can serve as connection points or bracketry for improved modal response and/or for rear or front crash response. In the exemplary embodiment shown in FIGS. 1, 2 and 4, the rocker support structure 230 can extend laterally from the exterior sidewall of the vertical linear structural element 210. Additionally, the rocker support structure 230 can extend around less than the entire perimeter of the external support structure 200 such that only select (e.g. five of the six) sides include the rocker support structure. For example, the front edge 4 (referring to FIG. 1) can be free of the rocker support structure 230. This configuration provides maximum protection from side/rear impact, while minimizing weight penalty at the front edge, which is typically positioned behind the front wheels of a vehicle and not prone to direct impact.

The external support structure 200 can also include multiple transverse cross-members attached to inside of either battery tray 300 and/or the external support structure 200. For example, the external support structure 200 can include transverse cross-members which coincide in location and are sized to nest within the transverse cross-members 310 of the battery tray 300. These brackets can be configured as Triangular brackets; L brackets; Pi clips; Rectangular blocks; and/or integrally molded features.

In some embodiments, the external support structure 200 includes integrally molded piping for coolant circulation around the perimeter of the support structure 200. Also, integrally molded features or cavities can be included to attach or support piping for coolant. Furthermore, the external support structure 200 can include mounting holes or bracketry for the attachment of burst discs and/or pressure relief valve(s).

The external support structure 200 can be attached directly to the lid 400 with fasteners, e.g. rivet nut fasteners, bonded threaded inserts etc. Additionally, or alternatively, the external support structure 200 can be attached to the battery tray 300, e.g. along flange 330, with the flange 330 attached to the lid 400 to form a removable subassembly. The rocker support structure 210 of the external support structure 200 can be sealingly attached to the base plate 100.

Base Plate

FIGS. 1, 5, 7 and 8 show an exemplary embodiment of the base plate 100 of the battery enclosure.

The base plate can be attached to external support structure and battery tray 300 (if present). In embodiments without the battery tray 300, the individual battery cells can be mounted onto the perimeter and transverse beams or onto the base plate 100. The battery tray 300 can include features or "spacers" which provide a stand-off (space or gap) between base plate 100 and battery tray 300 to accommodate impact deflection. These standoffs "spacers" can deform upon impact to absorb energy in the event of a crash. They are generally situated under the transverse members 310 to transfer load from the base plate 100 into the transverse members 310 or external support structure 200 preventing excessive load transfer directly into the battery tray. Additionally or alternatively, the base plate 100 can include spacers in the form of: Integrally molded features, Rectangular blocks or strips, Hat sections, Hollow beams, Cylinders, Spacers produced from Metallic skid rails or skid plates, and/or Integrally molded composite skid rails or skid plates. The spacers can be dispersed in a uniform manner with each spacer equidistant from an adjacent spacer; alternatively, the spacers can be non-uniform and scaled to accommodate batteries/cells of varying size.

Additionally, the base plate 100 can have a plurality of axial and transverse surface features 110 that outline and form "cells" for receipt of the individual batteries that constitute the vehicle power system. The presence of such surface features 110 facilitates assembly by providing tactile and visual confirmation of proper installment of the batteries within each cell via proper registration of mating surfaces.

In an exemplary embodiment, the surface features 110 can be formed as solid rib members protruding upwardly from a top surface of the base plate 100, however alternative configurations (e.g. hollowed conduits) are contemplated to be within the scope of the present disclosure.

The base plate 100 can be attached to the rocker support structure 210 which extends from the bottom edge of the external support member 200, and along the linear structural element 210 along edge 4 (where the rocker support structure 210 is omitted) so that the base plate and external support structure are joined along the entire periphery, or select portion(s) thereof. Similar to the union between lid 400, battery tray 300, and external support structure 200 and the base plate 100 can be coupled in a variety of ways including mechanical fastening, chemical (e.g. adhesive) bonding and/or fusing (e.g. ultrasonic welding).

Additionally, the transverse surface 402 features of the lid 400, can be positioned to match or align with similar transversely aligned surface features 310 in the battery tray 300 and base plate 110 so as to fully engage/envelope and create a closed volume to contain the individual battery cells that are assembled within. The formation of a closed volume is advantageous for isolating adverse events within any particular cell(s). Any one, or multiple, transverse walls 110, 210, 310 can include conduits to conduct heating/cooling and wiring to each cell housed therein.

In some embodiments, an additional sealing member can be provided between the lid 400 and the battery tray 300, and/or between the battery tray 300 and the base plate 100. The sealing member can extend only around the periphery. Additionally, or alternatively, the sealing member can extend around select cells. The sealing member can be formed as a compressible gasket, e.g. O-ring, to prevent fluid from entering or exiting the cells.

The various components disclosed herein can be formed from a variety of materials including reinforcing fibers. Some illustrative examples of such reinforcing fibers include carbon fiber, glass fiber, Kevlar (aramid) fiber; and combinations thereof. In some embodiments, polyethylene or polypropylene fibers can be employed that are stabilized in a matrix of resin from any of the following chemical classes of liquid thermosetting resins: epoxy, unsaturated isophthalic polyester, vinyl-ester, methyl-methacrylate or phenolic resins; or combinations thereof. In some embodiments, the reinforcing fibers can be stabilized in a thermoplastic resin that includes polyethylene, polypropylene, polyamide (nylon), acrylic, polycarbonate, polybutylene terephthalate (PBT), or polyphenylene sulfide (PPS); urethane resins or combinations thereof.

In accordance with an aspect of the disclosure, the materials of construction can include a plurality of individual layers of aligned, continuous (and/or unaligned discontinuous) fiber reinforcement of the fiber materials noted above. For example, the base member can be fabricated as a sandwich material with a plurality of layers of reinforcing materials laminated to a core of low density material from the class of core materials that may include: end grain balsa or the class of resins cast or extruded with internal foaming (blowing agents) that include polyvinyl chloride (PVC), cross-linked polyvinyl chloride (CPVC), styrene acrylonitrile (SAN), polyurethane, or polyethylene terephthalate (PET); polyurethane foam; and combinations thereof. In such embodiments, the cover member gains resistance from deformation due to perpendicularly applied loading that would be exerted from the load applied by the dense battery packs. However, the in-plane (extensional) stiffness of the lower structure can remain quite compliant (less stiff) as this stiffness is driven mostly by the moduli of the biaxial fibers in the laminate.

In some embodiments the various components described above are formed with a uniform cross sectional shape, whereas in other embodiments the support structures are formed with varying dimensions. For example, the axial support members forming the edges of the external support member 200 can have a larger cross-sectional shape than the transverse cross members 310 disposed between the edges of the battery tray.

In the embodiments illustrated, the cells are symmetrical (i.e. rectangular), however alternative designs are within the scope of the present disclosure. For example, the transverse structure support beams (or collectively the "cell walls") can be formed with varying, non-uniform, geometries. For instance, a gradient design can be employed with a greater number of cell walls (e.g. either smaller sized cells, or duplicate/parallel reinforcing walls) at the front of the battery enclosure, so as to increase rigidity for front-impact scenarios.

Additionally, in some embodiments the cell walls can have access features (e.g. apertures, grooves, etc.) formed therein to allow conduits and interconnections between neighboring cells such as wiring to/from the batteries contained within the cells. Similarly, these access features can serve as a ventilation means between battery cells. In some embodiments it may be desirable to direct a fluid flow through such access features to provide heating or cooling of the cells. Furthermore, in some embodiments the composite enclosure can include an access point, e.g. for technicians to replace equipment having a limited life cycle such as fuses, printed circuit boards, connectors, control equipment, etc. The access point can be formed as a resealable panel which can be opened by sliding along a horizontal axis of the enclosure, by pivoting about a hinge formed in the enclosure, or by being removed from the remainder of the enclosure. In some embodiments, the access point (and underlying replaceable equipment) is located in a compartment that is segregated from (i.e. not open to, nor in fluid communication with) the cells containing batteries. This configuration ensures a hermetic seal is maintained at all times (i.e. in compartments without an access panel) between the batteries and the ambient air.

Furthermore, although the exemplary embodiments illustrated herein depict a generally rectangular enclosure with constant thickness, alternative designs can be provided, e.g. battery enclosures having varied (tapered or stepped) width and/or height to accommodate both the battery capacity desired, and the vehicle chassis design dictating how and where the battery enclosure is to be coupled.

In some embodiments, a plurality of composite battery enclosures as described above, can be combined in a modular fashion, e.g., vertically stacked on top of each other to increase battery capacity. Such stacking increases the mass, and thus dampens any undesired vibratory loads, as well as increases the rigidity of the aggregate structure. Moreover, the composite battery enclosures of the present disclosure can be retrofitted to a previously formed vehicle chassis.

In accordance with another aspect of the disclosure, the composite battery enclosures described herein can incorporate electromagnetic shielding properties. In some embodiments the electromagnetic shielding can be provided around the exterior of the enclosure. In some embodiments the electromagnetic shielding can be provided around select cells (individual or plurality) of the enclosure. The presence of such EMF/EMC shielding inhibits any undesired electrical interference between the battery and other components of the vehicle.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A battery enclosure for a vehicle comprising:
a base plate having an upper and lower surface and a plurality of sides;
an external support structure having an upwardly extending wall, the external support structure disposed above the base plate and wherein the upwardly extending wall extends around the plurality of base plate sides;
a battery tray having an upper and lower surface with an upwardly extending sidewall extending along a side thereof, the battery tray disposed above the base plate and having a plurality of raised surface features on the upper surface outlining individual cells, each cell configured to receive a battery;
a lid having an upper and lower surface, the lid disposed on the upwardly extending sidewall of the battery tray; and
wherein an upper surface of the external support structure is disposed below an upper surface of the battery tray sidewall and extends along the side of the battery tray.

2. The battery enclosure of claim 1, wherein the height of the plurality of raised surface features which outline the individual cells is lower than the height of the upwardly extending sidewall of the battery tray.

3. The battery enclosure of claim 1, the external support structure includes a transverse cross-member nested within a transverse cross member of the battery tray.

4. The battery enclosure of claim 1, wherein the base plate, the external support structure, the battery tray or the lid is composed of a composite material.

5. The battery enclosure of claim 1, wherein the battery enclosure is coupled to a vehicle chassis.

6. The battery enclosure of claim 1, wherein the external support structure includes a flange extending laterally outward from the upwardly extending wall.

7. The battery enclosure of claim 6, wherein the flange is disposed at a bottom of the upwardly extending wall.

8. The battery enclosure of claim 6, wherein the flange of the external support structure extends outward a first distance, and a battery tray flange extends outward a second distance, the first distance greater than the second distance.

9. The battery enclosure of claim 6, wherein the flange of the external support structure extends from a plurality of sides of the external support structure.

10. The battery enclosure of claim 1, wherein the lid engages with the raised surface features of the battery tray to form a closed volume cell.

11. The battery enclosure of claim 1, wherein the external support structure forms a load-bearing structure.

12. The battery enclosure of claim 1, wherein an upper surface of the external support structure engages a lower surface of a battery tray flange.

13. The battery enclosure of claim 1, wherein a seal is formed between the lid and the battery tray.

14. A battery enclosure for a vehicle comprising:
a base plate having an upper and lower surface and a plurality of edges;
a battery tray having an upper and lower surface with upwardly extending sidewalls defining an interior portion, the battery tray disposed above the base plate and having a plurality of raised surface features on the upper surface of the interior portion outlining individual cells, each cell configured to receive a battery;
an external support structure having an upper surface and a lower surface, the external support structure disposed outside of the battery tray and above the base plate, with at least a portion of the external support structure circumscribing at least a portion of the battery tray; and
a lid having an upper and lower surface, the lid disposed above the battery tray.

15. The battery enclosure of claim 14, wherein the base plate extends between sidewalls of the battery tray.

16. The battery enclosure of claim 14, wherein the height of the upwardly extending sidewalls of the battery tray is greater than the height of the external support structure.

17. The battery enclosure of claim 14, wherein the external support structure is disposed along parallel sides of the battery tray.

18. The battery enclosure of claim 14, wherein the base plate, external support structure, battery tray or lid is composed of a composite material.

19. The battery enclosure of claim 14, wherein the battery enclosure is coupled to a vehicle chassis.

20. The battery enclosure of claim 14, wherein a seal is formed between the lid and the battery tray.

* * * * *